United States Patent [19]
Cox

[11] Patent Number: 5,450,304
[45] Date of Patent: Sep. 12, 1995

[54] SINGLE BOARD ENGINE CONTROLLER POWER SUPPLY

[75] Inventor: Michael A. Cox, Huntsville, Ala.

[73] Assignee: Chrysler Corporation, Highland Park, Mich.

[21] Appl. No.: 56,152

[22] Filed: Apr. 30, 1993

[51] Int. Cl.⁶ .......................................... H02M 3/335
[52] U.S. Cl. ........................................ 363/21; 363/97
[58] Field of Search ............... 363/21, 20, 101, 41, 363/97, 131; 323/222, 224; 318/599

[56] References Cited

U.S. PATENT DOCUMENTS

| | | |
|---|---|---|
| 4,502,152 | 2/1985 | Sinclair ................................ 455/73 |
| 4,549,254 | 10/1985 | Kissel . |
| 4,631,628 | 12/1986 | Kissel . |
| 4,639,659 | 1/1987 | Okanobu ............................ 323/224 |
| 4,899,256 | 2/1990 | Sway-Tin' . |
| 4,916,379 | 4/1990 | Wand et al. ......................... 323/222 |
| 4,920,532 | 4/1990 | Wroblewski . |
| 5,034,676 | 7/1991 | Kinzalow ............................ 323/268 |
| 5,083,078 | 1/1991 | Kübler et al. ....................... 323/268 |
| 5,134,355 | 7/1992 | Hastings ............................. 323/211 |
| 5,151,647 | 9/1992 | Frantz . |

Primary Examiner—Steven L. Stephan
Assistant Examiner—Adolf Berhane
Attorney, Agent, or Firm—Mark P. Calcaterra

[57] ABSTRACT

A power supply for controlling voltage supplied to a microprocessor-based controller, for an internal combustion engine utilizing pulse position modulation to regulate output voltage during periods of high engine controller power demand and output voltage feedback to regulate power during low engine controller demand.

8 Claims, 2 Drawing Sheets

SINGLE BOARD ENGINE CONTROLLER POWER SUPPLY

BACKGROUND OF THE INVENTION

1. Field of the Invention

The present invention relates generally to engine controllers and, more particularly to, a power supply for a single board engine controller.

2. Description of the Related Art

The energy crisis of the 1970's has forced automotive engine designers to turn to computer technology to improve fuel economy. Today, sophisticated on-board computers, called engine controllers, monitor engine-related operating variables such as intake and exhaust manifold temperature and pressure, engine temperature, coolant temperature and pressure, throttle position, engine timing, air and fuel flow, engine RPM, transmission gear selection, ambient pressure and temperature, as well as other operating variables. The engine controller uses the data from these operating variables to maximize engine performance, increase efficiency and minimize exhaust emissions under a variety of engine operating conditions.

Generally, the engine controller includes a power supply which has the demanding task of supplying the controller with the proper amount of electric power under greatly varying engine operating conditions. As such, the power supply must be able to regulate power under high and low load conditions on the engine controller. The power supply must also have the capability of supplying enough power to the engine controller for engine ignition to occur. The power supply relies totally on a vehicle battery for its source of power and, therefore, must be able to regulate its output voltage when the vehicle battery voltage is as low as 4.5 wHs (cold start voltage) and when the vehicle battery voltage is as high as 24 volts (series battery jump start). Typically, conventional timer pulsed power supply circuits are unable to vary the position of the output voltage pulse throughout the wide range of frequencies required in applications for the engine controller to provide adequate power regulation. Thus, there is a need in the art to provide an engine controller power supply which can supply adequate power during low battery voltage engine startup and precise regulation during high battery voltage engine startup. Also, there is a need in the art to provide a pulsed power supply for an engine controller.

SUMMARY OF THE INVENTION

It is, therefore, one object of the present invention to provide a power supply for an engine controller.

It is another object of the present invention to provide a power supply for a single board engine controller which will supply the necessary amount of power during high or low battery voltage conditions facilitating efficient engine startup.

It is yet another object of the present invention to provide a pulsed power supply capable of adequately regulating power for microprocessor based engine controllers.

It is still another object of the present invention to provide a pulsed power supply capable of adjusting the pulse frequency as required to supply the necessary power over a wide range of engine controller loads.

To achieve the foregoing objects, the present invention is a power supply circuit for an engine controller utilizing pulse position modulation for voltage control under low battery voltage conditions, and a unique approach using a zener diode to control the output voltage under high battery voltage conditions.

One advantage of the present invention is that a power supply is provided for a single board engine controller. Another advantage of the present invention is that the power supply utilizes a timing integrated circuit, resistors, capacitors, diodes, field effect transistors and an inductor to provide regulated power to the engine controller during start up and varying engine operating conditions. Yet another advantage of the present invention is that the output voltage of the power supply is fed back to a timer, providing precise power regulation by varying output frequency according to engine controller demand. Still another advantage of the present invention is that the power supply utilizes a freewheeling circuit which enables a power inductor to boost the battery voltage to a level high enough to power the engine controller during low battery voltage engine startup. A further advantage of the present invention is that, when high battery voltage conditions are present, the power supply accurately regulates engine controller power by utilizing output voltage feedback to control the frequency of the timer output pulses. In this manner, the present invention is able to provide the necessary engine controller power independent of startup battery voltage conditions.

Other objects, features and advantages of the present invention will be readily appreciated as the same becomes better understood after reading the subsequent description taken in conjunction with the accompanying drawings.

DESCRIPTION OF THE PREFERRED EMBODIMENTS

Figure 1:
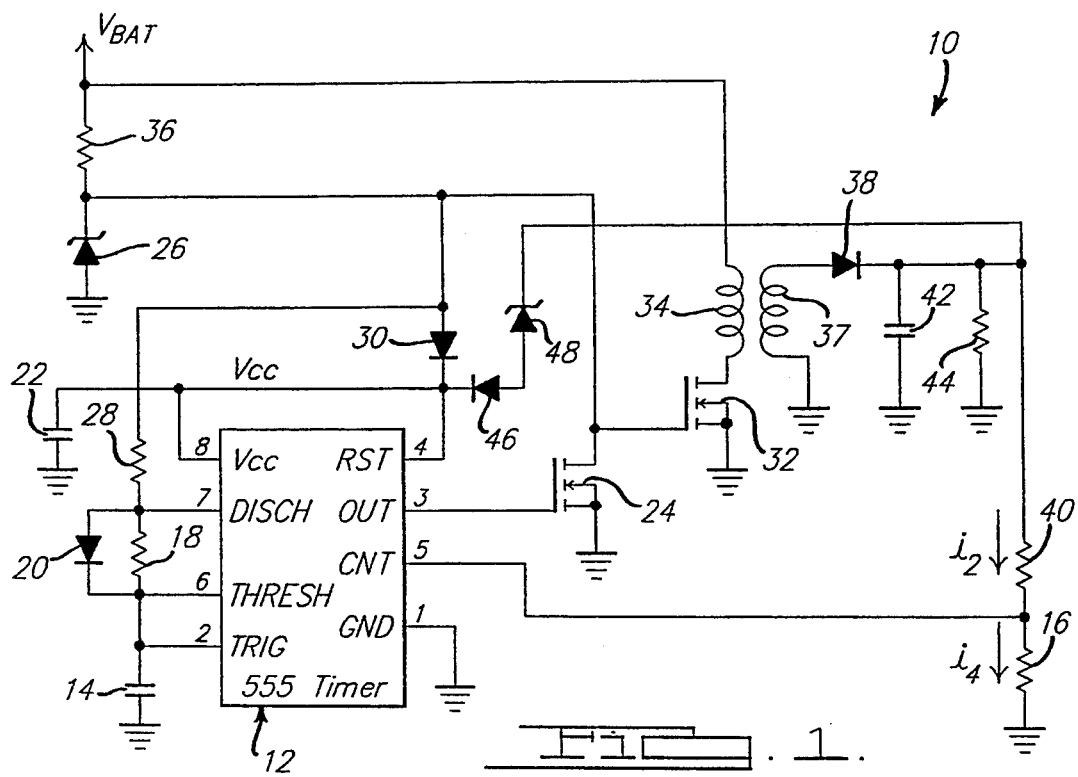
FIG. 1 is a circuit schematic of a single board engine controller power supply according to the present invention.

Referring to FIG. 1, a circuit 10 for a power supply, according to the present invention, is illustrated for a single board engine controller (not shown). The power supply circuit 10 is designed to provide a pulsed power supply to the engine controller. It should be appreciated that the power supply circuit 10 may be used to provide power regulation in both automotive and non-automotive applications.

The power supply circuit 10 includes a timer, generally indicated at 12, to provide voltage regulation. Preferably, the timer 12 is a 555 timer although any suitable timer may be used. A discussion of the 555 timer is disclosed in Signetics AN170 Application Note and is hereby expressly and specifically incorporated by reference.

Referring to FIG. 1, the power supply circuit 10 includes a capacitor 14 interconnecting pin 2 of the timer 12 and ground. Pin 1 of the timer 12 is also connected to ground. The power supply circuit 10 includes a resistor 16 interconnecting pin 5 of the timer 12 and ground. The power supply circuit 10 also includes a resistor 18 interconnecting pin 6 and pin 7 of the timer 12 and a diode 20 connected in parallel to the resistor 18. The power supply circuit 10 further includes a capacitor 22 interconnecting pin 8 of the timer 12 and ground. The power supply circuit 10 includes a transistor 24 whose source interconnects pin 3 of the timer 12 and ground. The power supply circuit 10 also includes a diode 26 interconnecting ground and a drain of the transistor 24. The power supply circuit 10 also includes a resistor 28 and a diode 30 interconnecting pin 7 and pin 4 of the timer 12. The power supply circuit 10 further includes a transistor 32 whose source is connected to the drain of the transistor 24 and ground. The power supply circuit 10 includes a first coil or inductor 34 connected to a drain of the transistor 32 and to a source of power, $V_{BAT}$ such as a vehicle battery (not shown). The power supply circuit 10 includes a resistor 36 interconnecting $V_{BAT}$ and the diode 26. The power supply circuit 10 includes a second coil or inductor 37 connected to ground and a diode 38 connected to the second inductor 37. The power supply circuit 10 includes a resistor 40 interconnecting the diode 38 and resistor 16. The power supply circuit 10 includes a capacitor 42 and a resistor 44 interconnecting ground and diode 38 and the resistor 40. The power supply circuit 10 includes diodes 46 and 48 interconnecting pin 4 of the timer 12 and resistor 40. It should be appreciated that inductors 34 and 37 cooperate to form a transformer.

Figure 2:
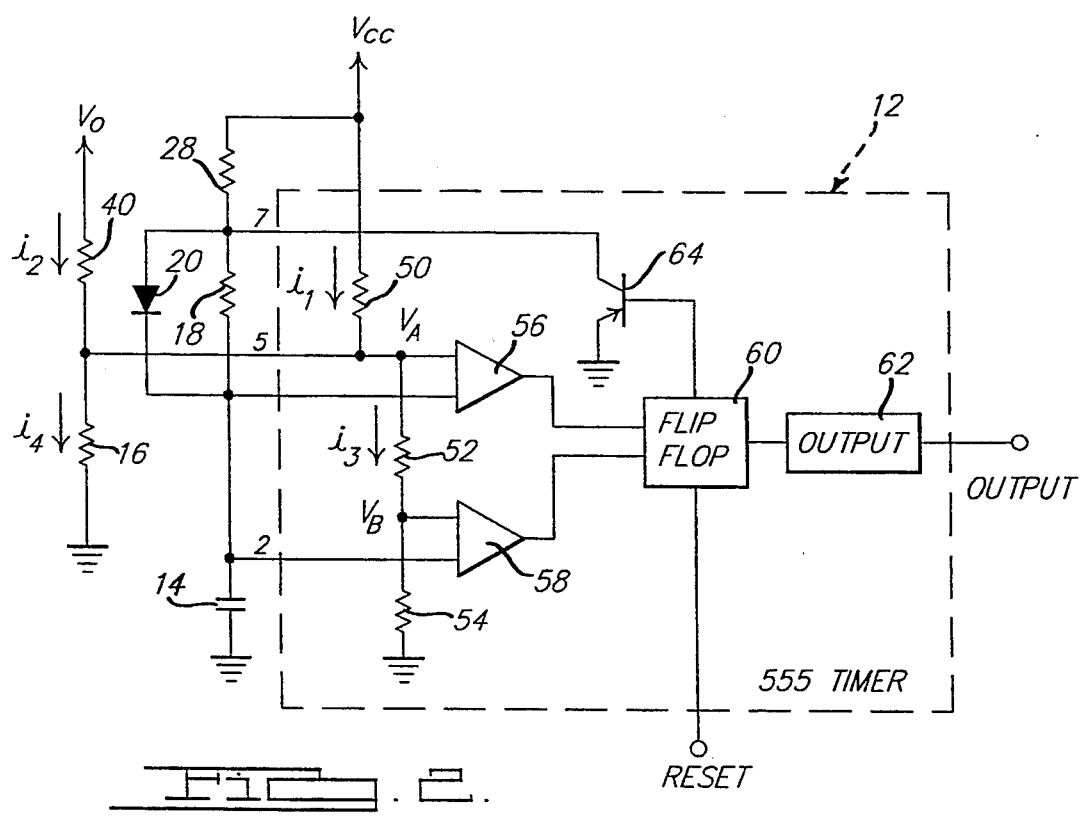
FIG. 2 is a circuit schematic illustrating the internal workings of a timer for the single board engine controller power supply of FIG. 1.

Referring to FIG. 2, the timer 12 and a limited number of external components are shown to aid in illustrating an astable mode of operation of the timer 12. The timer 12 operates normally in the astable mode, functioning simply as an oscillator to pulse power to the engine controller. During periods of high or low load on the engine controller, output voltage feedback and pulse position modulation provide accurate power regulation. The timer 12 includes three resistors 50, 52 and 54, two comparators 56 and 58, a flip-flop 60, an output 62 and a discharge transistor 64. Preferably, the resistors 50, 52 and 54 have an equal rating such as 5 k ohms. The resistors 50, 52 and 54 form a voltage divider which forces Va at pin 5 of timer 12 to equal ⅔ of the supply voltage Vcc, and Vb at comparator input 58 to equal ⅓ of the supply voltage Vcc. Upon applying power to pin 8 of the timer 12, labeled Vcc in FIG. 2, current begins to flow through the resistors 28 and 18 and charges the capacitor 14. When the voltage across the capacitor 14 equals ⅔ of the supply voltage Vcc, the comparator 56 connected to pin 6 of the timer 12, changes state, resets the flip-flop 60 and turns the discharge transistor 64 'on'. After turning 'on' the capacitor 14 drains through the resistor 18, pin 7 and the discharge transistor 64. After the capacitor voltage has decreased to ⅓ timer supply voltage, Vcc, the comparator 58 connected to the pin 2 changes state, sets the flip-flop 60 and turns the discharge transistor 64 'off'. This causes current to flow once again through the resistors 18 and 28, thereby charging the capacitor 14. Under ideal load conditions on the engine controller, the timer 12 will continue to oscillate indefinitely in the astable mode with the capacitor 14 charging and discharging between ⅓ and ⅔ the timer supply voltage, Vcc.

The timer 12 is designed so that the output 62, is in a 'high' state while the capacitor 14 is charging from Vb to Va. Typically, the capacitor 14 charges from ⅓ to ⅔ Vcc. Conversely, it follows that the output will be in a 'low' state when the capacitor 14 discharges from Va to Vb or usually from ⅔ to ⅓ Vcc. As a result, the time that the output remains 'high' is determined by the time constant $(R_{28}+R_{18}) * C_{14}$, while the amount of time that the output remains low is determined by the time constant $R_{18} * C_{14}$ The ratio of the amount of time that the output is 'high' versus the amount of time that the output could possibly be 'high' is referred to as the timer's duty cycle. If the diode 20 is placed in parallel with the resistor 18 as illustrated in FIG. 2, the time constant for charging the capacitor 14 becomes $R_{18} * C_{14}$ enabling duty cycles of less than 50% to be implemented. Therefore, by choosing the proper external component values, the timer 12 can be forced to oscillate at many different frequencies and duty cycles.

Referring once again to FIGS. 1 and 2, pulse position modulation operation of the timer 12 can be illustrated. Since node Va is accessible via a control voltage pin 5 of the timer 12, the voltage at Va, though normally ⅔ Vcc, can be varied up or down by applying an external signal to the control voltage pin 5. Raising the voltage at Va requires that the capacitor 14 charge for a longer period of time before the comparator 56 will change states since it will now have to charge to a higher voltage. However, if an external signal is applied to pin 5 that lowers the voltage at Va, the capacitor 14 will not have to charge as long before the comparator 56 will change states. As a result of applying a fluctuating signal at Va, the capacitor 14 charge time will also vary. Due to the varying charge times of capacitor 14, the output pulse at pin 3 of the timer 12 will vary in width producing pulse position modulation.

In operation, when the transistor 32 is turned 'on,' current begins flowing through the first inductor 34. A negative voltage equal in magnitude to $V_{BAT}$ appears at the anode of the diode 38 while current begins flowing in the second inductor 37 from ground to the diode 38. When the transistor 32 cuts off, current quits flowing in the first inductor 34 and the negative voltage at the anode of the diode 36 disappears. However, since current cannot stop flowing instantaneously in an inductor, current continues to flow through the diode 36 charging the capacitor 42. If this cycle is repeated too rapidly or too slowly, the voltage, Vo, would rise too high or drop too low. Therefore, it is necessary that the transistor 32 be switched 'off' and 'on' at the proper frequency.

To control the output voltage, Vo, at some desired voltage level, it is fed back to the timer 12. The signal from Vo is fed back to control pin 5 of the timer 12, which varies the voltage Va, in turn, causing the pulse widths at the output pin 3 of the timer 12 to fluctuate. If Vo goes up, Va increases and the pulse widths get wider. If Vo decreases in amplitude, Va decreases and the pulse widths get thinner. It should be appreciated that it is actually dependent upon a signal proportional to the value Vo that is fed back to pin 5 from the voltage divider 16 and 40. The values of resistors 16 and 40 are chosen so that when Vo reaches a maximum specified voltage limit, Va will equal Vcc.

Upon analysis of the power supply circuit 10, the charge and discharge times for the capacitor 14 can be represented by the following sets of equations:

CHARGING:

$$Vca = [Vb - Vcc] * e[-Tc/R_{28} * C_{14}] + Vcc$$

Since Vca equals Va when $C_{14}$ is fully charged:

$$\frac{V_a - V_{cc}}{V_b - V_{cc}} = e^{(-T_c/R_{28})}$$

Vb=0.5 Va from voltage division:

$$\frac{V_a - V_{cc}}{0.5V_a - V_{cc}} = e^{(-T_c/R_{28})}$$

$$T_c = -R_{28} * C_{14} * \ln[(V_a - V_{cc})/(0.5V_a - V_{cc})]$$

DISCHARGING:

$$V_{ca} = V_a * e^{(-T_d/R_{18}*C_{14})}$$

Set Vca=Vb:

$$V_b = V_a * e^{(-T_D/R_{18}*C_{14})}$$

$$T_d = -\ln(V_b/V_a) * R_{18} * C_{14}$$

Vb=0.5 Va from voltage division:

$$T_d = -\ln(0.5) * R_{18} * C_{14}$$

Tc=time for $C_{14}$ to charge from Vb to Va
Td=time for $C_{14}$ to discharge from Va to Vb
Vca=voltage across capacitor $C_{14}$ To reiterate, since Va can be changed, either by a change in Vcc or due to an applied control voltage, the charging time of the capacitor 14 can be varied. Thus, an applied control voltage at pin 5 would increase Va and the capacitor 14's charging time, Tc. An increase in Vcc would also lengthen capacitor 14's charge time. However, it should be appreciated that the discharge time, Td, is fixed because it is solely dependent upon external component magnitudes.

Pulse position modulation voltage regulation is utilized to regulate heavy loads and low battery conditions for the circuit 10. Referring to FIG. 2, the resistors 50, 52, 54 internal to the timer 12 are all 5 k ohms. In FIG. 2, the equivalent circuit between the feedback circuit of Vo, resistors 16 and 40, and the timer 12 including of Vcc, Va and the resistors 50, 52, 54 are shown. Upon analysis it is apparent that:

$$i1 + i2 = i3 + i4$$

$$\frac{V_{cc} - V_a}{5k} + \frac{V_o - V_a}{R_{50}} = \frac{V_a}{10k} + \frac{V_a}{R_{52}}$$

Solving for Va:

$$V_a = \frac{10k * R_{52} * R_{50} * V_{cc} + 10k * R_{52} * 5k * V_o}{5k * R_{50} * R_{52} + 5k * R_{50} * 10k + 10k * R_{52} * R_{50} + 10k * R_{52} * 5k}$$

From this derivation, it is shown that Va increases and the output pulse widens as Vo increases. An inverting small signal Field Effect Transistor (FET) 24 is connected to output pin 3, inverting the output pulse and turning switching transistor 32 off when pin 3 is 'high'. Thus, when engine controller loads decrease causing Vo to rise, Vcc and Va both rise increasing the timer output pulse width applied to the gate of the transistor 24. Increasing the output pulse applied to the transistor 24 decreases the turn "on" time for switching transistor 32. The transistor 32 stays "on" for a shorter duration causing less energy to be stored in the second inductor 37. Since Vo is dependent upon the amount of energy stored in the second inductor 37, reducing transistor 32's turn "on" time reduces the amount of energy stored in the second inductor 37, thus regulating Vo.

However, pulse position modulation using the timer 12, in our example a 555 timer, is only capable of varying the output frequency about ±25% the desired center regulation frequency. Therefore, pulse position modulation alone cannot provide adequate regulation for light load and high battery voltage conditions. A second method of regulation is implemented in the circuit 10 to provide the necessary regulation for these conditions.

For light loads and high or overcharged battery voltage conditions, diodes 30, 46 and 48 form a second feedback loop to the timer 12. The diode 48 is a zener diode having a breakdown voltage which controls Vo's maximum magnitude. When Vo rises above it's maximum, the diode 48 goes into breakdown conducting through the diode 46. This increases the timer supply voltage, Vcc, to Vo - Vz - Vd, where Vz is zener diode 48's breakdown voltage and Vd equals the voltage drop across the diode 46. Vcc is now higher than the regulated voltage level set by the zener diode 26. Since capacitor 14 can only charge up to the regulated voltage level set by the diode 26, the threshold comparator 56 at Va never changes states, the discharge transistor 64 within the timer 12 output stays 'high'. Since capacitor 14 cannot discharge, the timer output stays 'high' causing the transistor 32 to stay 'off'. As engine controller demand lowers Vo, the diode 48 will come out of the breakdown region, Vcc will decrease to its regulated voltage level as set by the diode 26, the threshold comparator 56 will change states causing the internal discharge transistor 64 to discharge the capacitor 14 and the timer 12 will begin oscillating normally once again. It should be appreciated that the purpose of the diode 30 is to prevent the capacitor 14 from charging to the regulated voltage level set by the diode 26 (and hence never discharging) during the breakdown of the diode 48.

Figure 3:
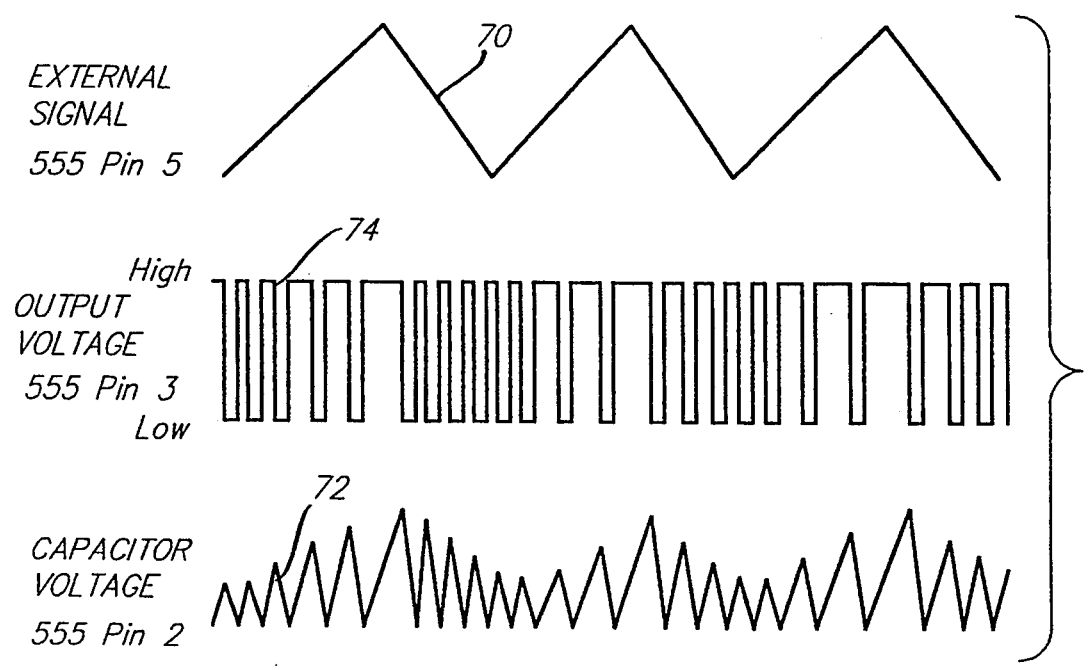
FIG. 3 is a waveform diagram illustrating typical operation of the single board engine controller power supply of FIG. 1.

Referring to FIG. 3, a typical set of waveforms is shown for power supply circuit 10. In FIG. 3, the external signal waveform 70 includes the feedback signal from voltage divider formed by the resistors 16 and 40 applied to the control voltage pin 5 of the timer 12. The capacitor voltage waveform 72 illustrates the charging and discharging of the capacitor 14. The output voltage waveform 74 represents the signal from the output pin 3 of the timer 12 which controls the transistor 32.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A power supply circuit for an engine controller, comprising:
   an external circuit connected to a battery voltage for reducing and monitoring the battery voltage;
   a timer circuit connected to said external circuit and receiving the reduced battery voltage for controlling power to the engine controller; and a freewheeling circuit connected to the battery voltage and said timer for controlling power to the engine controller during a low battery voltage condition, said freewheeling circuit comprising a first transistor, a first resistor connected to said first transistor, and a second transistor connected to said first transistor, a coil connected to said second transistor, a first diode connected to said coil, a first capacitor and a second resistor connected to said coil.

2. A power supply circuit as set forth in claim 1 wherein said timer circuit comprises third, fourth, and fifth resistors to form a voltage divider, a first and second comparator connected to said voltage divider, a flip-flop connected to said first and second comparators, a discharge transistor connected to said flip-flop, and an output lead connected to said flip-flop.

3. A power supply circuit as set forth in claim 1 wherein said external circuit comprises a second diode, a first zener diode connected to said second diode, a third diode connected to said second diode and a reset wire of said timer and a voltage supply, a second zener diode connected said third diode, a sixth resistor connected to said second zener diode, a second capacitor connected to the voltage supply, a voltage divider connected to said third diode, a fourth diode connected to said voltage divider, and a third capacitor connected between said voltage divider and ground.

4. A power supply circuit to supply pulsed power to a microprocessor based engine controller comprising:
an external circuit connected to a battery voltage for reducing and monitoring the battery voltage;
a timer circuit connected to said external circuit and receiving the reduced battery voltage for delivering pulsed power at various frequencies and pulse widths to the engine controller; and
a freewheeling circuit connected to the battery voltage and said timer for controlling power to the engine controller during a low battery voltage condition, said freewheeling circuit comprising a first transistor connected to an output of said timer circuit, a first transistor connected to said second transistor, said second transistor operating according to an input signal from said first transistor, a transformer connected to a drain of said second transistor in which current flows through said transformer from said second transistor, a first diode connected to said transformer, a capacitor connected to said first diode and ground, a first resistor connected in parallel with said capacitor, and a first voltage divider connected between said timer circuit and said resistor.

5. A power supply circuit as set forth in claim 4 wherein said timer circuit comprises a second voltage divider connected between the battery voltage and a ground, a first and second comparator connected to said second voltage divider, a flip-flop connected to both the said first and second comparator, and an internal discharge transistor with its base connected to said flip-flop.

6. A power supply circuit as set forth in claim 4 wherein said external circuit comprises a second diode, a first zener diode connected in series with said second diode, said first zener diode connected to said external circuit, a third diode connected to said second diode, a second zener diode connected to said first voltage divider, a second capacitor connected to said second diode, a second voltage divider connected to the said third diode, a fourth diode in parallel with said second voltage divider, and a third capacitor connected between said second voltage divider and ground.

7. The power supply circuit of claim 5 wherein said first voltage divider comprises second, and third resistor in series between the battery voltage and the ground, said first voltage divider controlling the voltage sent to said first and second comparator.

8. A power supply circuit for an engine controller comprising:
a timer circuit including a first, second, and third resistor connected in series to form a voltage divider, a first and second comparator connected to said voltage divider, a flip-flop connected to said comparators, a discharge transistor connected to said flip-flop, and an output lead connected to said flip-flop, for controlling an interval between power pulses to the engine controller;
a freewheeling circuit connected to said timer circuit and including a first transistor connected to said output lead of said timer circuit, a fourth resistor and a second transistor connected to said first transistor, a coil connected to said second transistor, a first diode connected to said coil, a first capacitor, and a fifth resistor for power control to the engine controller during low battery voltage conditions; and
an external circuit connected to said timer circuit and including a second diode and a first zener diode connected to said second diode, a third diode connected to said second diode and a reset wire of said timer circuit and a voltage supply Vcc, a second zener diode connected to said third diode, a sixth resistor connected to said second zener diode, a second capacitor connected to the voltage source, a voltage divider connected to said third diode, a fourth diode connected to said voltage divider, and a third capacitor connected between said voltage divider and ground.

* * * * *